(12) United States Patent
Mukherjee et al.

(10) Patent No.: US 8,699,711 B2
(45) Date of Patent: Apr. 15, 2014

(54) METHOD AND APPARATUS TO IMPLEMENT SECURITY IN A LONG TERM EVOLUTION WIRELESS DEVICE

(75) Inventors: Rajat P. Mukherjee, Montreal (CA); Peter S. Wang, East Setauket, NY (US); Mohammed Sammour, Montreal (CA); Shankar Somasundaram, Deer Park, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 1268 days.

(21) Appl. No.: 12/173,253

(22) Filed: Jul. 15, 2008

(65) Prior Publication Data
US 2009/0025060 A1 Jan. 22, 2009

Related U.S. Application Data

(60) Provisional application No. 60/950,486, filed on Jul. 18, 2007.

(51) Int. Cl.
*H04W 12/10* (2009.01)
*H04L 29/06* (2006.01)
*H04W 12/00* (2009.01)

(52) U.S. Cl.
CPC .............. *H04W 12/10* (2013.01); *H04W 12/00* (2013.01); *H04L 63/123* (2013.01)
USPC .......................................... 380/270; 713/155

(58) Field of Classification Search
USPC .................................. 726/1–5; 380/270–272
See application file for complete search history.

(56) References Cited

U.S. PATENT DOCUMENTS

| | | | |
|---|---|---|---|
| 7,065,340 B1 | 6/2006 | Einola et al. | |
| 2001/0042206 A1* | 11/2001 | Carro et al. | 713/176 |
| 2002/0066011 A1* | 5/2002 | Vialen et al. | 713/150 |
| 2002/0105971 A1* | 8/2002 | Tourunen et al. | 370/469 |
| 2003/0105951 A1* | 6/2003 | Brabson et al. | 713/151 |
| 2003/0137931 A1* | 7/2003 | Hans et al. | 370/216 |
| 2004/0184437 A1* | 9/2004 | Lee et al. | 370/349 |
| 2004/0224669 A1* | 11/2004 | Pedlar et al. | 455/412.1 |
| 2005/0026616 A1* | 2/2005 | Cavalli et al. | 455/436 |

(Continued)

FOREIGN PATENT DOCUMENTS

| | | |
|---|---|---|
| EP | 1231745 A2 | 8/2002 |
| RU | 2282943 C2 | 8/2006 |
| WO | WO 2007/078159 A1 | 7/2007 |

OTHER PUBLICATIONS

3rd Generation Partnership Project (3GPP); TR 33.821 V0.4.0; "3rd Generation Partnership Project; Technical Specification Group Services and System Aspects; Rationale and track of security decisions in Long Term Evolved (LTE) RAN / 3GPP System Architecture Evolution (SAE) (Release 8)", Jul. 2007, 94 pages.

(Continued)

*Primary Examiner* — Gilberto Barron, Jr.
*Assistant Examiner* — David Le
(74) *Attorney, Agent, or Firm* — Condo Roccia Koptiw LLP

(57) ABSTRACT

A wireless transmit receive unit (WTRU) is configured to receive unciphered and ciphered messages. The unciphered messages include identity requests, authentication requests, non-access stratum (NAS) security mode commands and tracking area update responses. The ciphered messages may come from the NAS and a Radio Resource Controller (RRC). The messages are ciphered using security keys.

22 Claims, 7 Drawing Sheets

(56) References Cited

U.S. PATENT DOCUMENTS

| | | | |
|---|---|---|---|
| 2005/0176431 A1 | 8/2005 | Herrero Veron | |
| 2005/0177797 A1* | 8/2005 | Yajima et al. | 715/781 |
| 2005/0286526 A1* | 12/2005 | Sood et al. | 370/394 |
| 2007/0230707 A1* | 10/2007 | Blom et al. | 380/277 |
| 2007/0254666 A1* | 11/2007 | De Jong et al. | 455/436 |
| 2008/0051084 A1* | 2/2008 | Casati et al. | 455/435.1 |
| 2010/0293372 A1* | 11/2010 | Fischer et al. | 713/168 |

OTHER PUBLICATIONS

3GPP TSG SA WG3 meeting #45, "Reply LS on assumptions for security procedures," R2-063036, R2-062718, (Ashburn, VA, USA, Oct. 31-Nov. 3, 2006).

Nokia et al., "Security algorithm negotiation in SAE/LTE networks," 3GPP TSG SA WG3 Security—SA3#46, S3-070100 (Feb. 13-16, 2007).

Third Generation Partnership Project, "Technical Specification Group Services and System Aspects; Rationale and track of security decisions in Long Term Evolved (LTE) RAN/3GPP System Architecture Evolution (SAE) (Release 8)," 3GPP TR 33.821 V0.3.0, (Jun. 2007).

Third Generation Partnership Project, "Technical Specification Group Services and System Aspects; Rationale and track of security decisions in Long Term Evolved (LTE) RAN/3GPP System Architecture Evolution (SAE) (Release 8)," 3GPP TR 33.821 V0.8.0, (Jun. 2008).

Third Generation Partnership Project, Technical Specification Group Core Network and Terminals; Mobile radio interface Layer 3 specification; Core network protocols; Stage 3 (Release 7), 3GPP TS 24.008 V7.8.0, (Jun. 2007).

Third Generation Partnership Project, Technical Specification Group Core Network and Terminals; Mobile radio interface Layer 3 specification; Core network protocols; Stage 3 (Release 7), 3GPP TS 24.008 V7.12.0, (Jun. 2008).

Third Generation Partnership Project, Technical Specification Group Core Network and Terminals; Mobile radio interface Layer 3 specification; Core network protocols; Stage 3 (Release 8), 3GPP TS 24.008 V8.0.0 (Dec. 2007).

Third Generation Partnership Project, Technical Specification Group Core Network and Terminals; Mobile radio interface Layer 3 specification; Core network protocols; Stage 3 (Release 8), 3GPP TS 24.008 V8.2.0 (Jun. 2008).

Third Generation Partnership Project, Technical Specification Group Core Network; Mobile radio interface signalling layer 3; General aspects (Release 7), 3GPP TS 24.007 V7.0.0 (Oct. 2005).

Third Generation Partnership Project, Technical Specification Group Radio Access Network; Radio Link Control (RLC) protocol specification (Release 7), 3GPP TS 25.322 V7.2.0 (Oct. 2006).

Third Generation Partnership Project, Technical Specification Group Radio Access Network; Radio Link Control (RLC) protocol specification (Release 7), 3GPP TS 25.322 V7.7.0 (Jun. 2008).

Third Generation Partnership Project, Technical Specification Group Radio Access Network; Radio Link Control (RLC) protocol specification (Release 8), 3GPP TS 25.322 V8.2.0 (Jun. 2008).

Third Generation Partnership Project, Technical Specification Group Radio Access Network; Medium Access Control (MAC) protocol specification (Release 7), 3GPP TS 25.321 V7.5.0 (Jul. 2007).

Third Generation Partnership Project, Technical Specification Group Radio Access Network; Medium Access Control (MAC) protocol specification (Release 7), 3GPP TS 25.321 V7.9.0 (Jun. 2008).

Third Generation Partnership Project, Technical Specification Group Radio Access Network; Medium Access Control (MAC) protocol specification (Release 8), 3GPP TS 25.321 V8.2.0 (Jun. 2008).

Third Generation Partnership Project, "Technical Specification Group Services and System Aspects; Rationale and track of security decisions in Long Term Evolved (LTE) RAN/3GPP System Architecture Evolution (SAE) (Release 8)," 3GPP TR 33.821 V0.4.0, (Jul. 2007).

Third Generation Partnership Project, Technical Specification Group Core Network and Terminals; 3GPP System Architecture Evolution; CT WG1 Aspects (Release 8), 3GPP TR 24.801 V0.2.0, (May 2007).

Third Generation Partnership Project, Technical Specification Group Radio Access Network; Radio Resource Control (RRC); Protocol Specification (Release 7), 3GPP TS 25.331 V7.4.0 (Apr. 2007).

Third Generation Partnership Project, Technical Specification Group Radio Access Network; Radio Resource Control (RRC); Protocol Specification (Release 7), 3GPP TS 25.331 V7.9.0 (Jul. 2008).

Third Generation Partnership Project, Technical Specification Group Radio Access Network; Radio Resource Control (RRC); Protocol Specification (Release 8), 3GPP TS 36.331 (Jul. 2008).

Third Generation Partnership Project, Technical Specification Group Radio Access Network; Radio Resource Control (RRC); Evolved Universal Terrestrial Radio Access (E-UTRA); Packet Data Convergence Protocol (PDCP) specification (Release 8), 3GPP TS 36.323 (Mar. 2008).

Zte Corporation, "Protect the network against replay of signaling messages between MME and UE," 3GPP TSG SA WG3 Security—S3#48, S3-070513 (Jul. 10-13, 2007).

Ericsson, "Key Handling when entering idle mode and coding of security capabilities," 3GPP TSG-RAN2 Meeting #36, R2-031310 (May 15-16, 2003).

Nokia Siemens Networks et al., "Adding content to section 7 of TS33.abc (SAE: Security Architecture)," ˥3GPP TSG SA WG3 Security—SA3#48, S3-070526 (Jul. 10-13, 2007).

Third Generation Partnership Project, Technical Specification Group Core Network and Terminals; 3GPP System Architecture Evolution; CT WG1 Aspects (Release 8), 3GPP TR 24.801 V0.2,0, (May 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.1.0 (Jun. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.5.0 (May 2008).

Third Generation Partnership Project, Technical Specification Group Radio Access Network; Radio Resource Conrol (RRC); Protocol Specification (Release 7), 3GPP TS 25.331 V7.4.0 (Apr. 2007).

Third Generation Partnership Project, Technical Specification Group Radio Access Network; Radio Resource Control (RRC); Protocol Specificaion (Release 7), 3GPP TS 25.331 V7.4.0 (Apr. 2007).

3rd Generation Partnership Project (3GPP), R2-062718, "Reply LS to SA3 on MAC, RLC And RRC layer security", TSG RAN WG2, 3GPP TSG RAN2 WG2#54, Tallinn, Estonia, Aug. 28-Sep. 1, 2006, 2 pages.

3rd Generation Partnership Project (3GPP), R2-063036, "LS on assumptions for security procedures", RAN2, 3GPP TSG-RAN 2 Meeting #55, Seoul, South Korea, Oct. 9-13, 2006, 2 pages.

3rd Generation Partnership Project (3GPP), R2-063507, "Reply LS on assumptions for security procedures", Draft for SA3, 3GPP TSG RAN2-56, Riga, Latvia, Nov. 6-11, 2006, 3 pages.

3rd Generation Partnership Project (3GPP), R2-072747, "3rd Generation Partnership Project; Technical Specification Group Radio Access Network; Evolved Universal Terrestrial Radio Access (E-UTRA) Packet Data Convergence Protocol (PDCP) specification (Release 8)", (3GPP TS 36.323 Vx.y.z), Jun. 2007, 12 pages.

3rd Generation Partnership Project (3GPP), S3-060649, "Discontinuous Packet Sequence Numbers", Nokia, 3GPP TSG-SA WG3 #45, Dulles, US, Oct. 31-Nov. 3, 2006, 2 pages.

3rd Generation Partnership Project (3GPP), S3-060833, "Reply LS on assumptions for security procedures", Draft for SA3, 3GPP TSG SA WG3 meeting #45, Ashburn, VA, USA, Oct. 31-Nov. 3, 2006, 2 pages.

3rd Generation Partnership Project (3GPP), S3-070240, "Key change during LTE Active", Nokia, Siemens Networks, 3GPP TSG SA WG3 Security—SA3#46b, Sophia Antipolis, France, Mar. 28-29, 2007, 4 pages.

(56) References Cited

OTHER PUBLICATIONS

3rd Generation Partnership Project (3GPP), S3-070272, "Comments to Key refresh in SAE/LTE", Huawei, 3GPP TSG SA WG3 Security—SA3#46b, Sophia Antipolis, Mar. 28-29, 2007, 7 pages.

3rd Generation Partnership Project (3GPP), TS 33.102 V6.5.0, "3rd Generation Partnership Project; Technical Specification Group Services and System Aspects; 3G Security; Security Architecture (Release 4)", Dec. 2012, 63 pages.

* cited by examiner

METHOD AND APPARATUS TO IMPLEMENT SECURITY IN A LONG TERM EVOLUTION WIRELESS DEVICE

CROSS REFERENCE TO RELATED APPLICATIONS

This application claims the benefit of U.S. provisional application 60/950,486 filed on Jul. 18, 2007, which is incorporated by reference as if fully set forth.

TECHNOLOGY FIELD

The method and apparatus are related to wireless communications. More particularly, the method and apparatus are related to secure communications in a Long Term Evolution compliant wireless device.

BACKGROUND

Current goals for the Third Generation Partnership Project (3GPP) Long Term Evolution (LTE) program are to bring new technology, new architecture and new methods to new LTE settings and configurations in order to provide improved spectral efficiency and reduced latency for better utilization of radio resources for faster user experiences and richer applications and services with less cost.

As part of this evolution process, the 3GPP group will use different security architectures in LTE than used in Universal Mobile Telephone System (UMTS) and Global System for Mobile Communications (GSM) systems. For the sake of comparison, let the UMTS Authentication and Key Agreement (AKA) procedures, in packet switched (PS) domain, be the baseline for the proposed new LTE procedures.

FIG. 1 shows a UMTS access stratum protocol stack 100. The UMTS AKA and ciphering procedures are spread over multiple protocol layers and use both non-access stratum (NAS) and radio resource control (RRC) signaling to accomplish their goals. Generally, identification and authentication of the wireless transmit receive unit (WTRU) is accomplished via NAS signaling. Once authentication at a NAS level is accomplished, ciphering and/or integrity protection is activated by the network using the Security Mode Command which is a RRC message. Once security is activated using the Security Mode Command at the RRC layer, the WTRU passes the ciphering and integrity keys (CK and IK) to the access stratum (AS) using the GMMAS-SECURITY-RES primitive over the GMMAS-SAP (defined between GPRS Mobility Management (GMM) and the AS). After receiving these keys, the RRC 110 passes them to the radio link controller (RLC) 120 and medium access control (MAC) 130 using the CRLC-CONFIG primitive (over the C-SAP between the RRC and RLC) and the CMAC-CONFIG primitive (over the C-SAP between the RRC and MAC). The C-SAP (not shown) is a Service Access Point for C-plane signaling between the RRC and lower layers. The actual ciphering and integrity protection is usually performed in the RLC 120, but is performed in the MAC 130 in case of transparent RLC mode traffic. The lower layers (i.e. MAC/RLC) are responsible for ensuring that messages intended for upper layers (e.g. Layer 3 NAS messages) have been integrity protected and/or ciphered correctly. If not, the lower layers ignore/drop the message. Once security has been activated all C-plane and U-plane security is done in the RLC or MAC.

For LTE, a radically different architecture for security has been proposed. The main difference is that instead of a single security layer (i.e. in the MAC/RLC) there are three layers of security: NAS security, RRC security and U-plane security. Each layer has its own keys. NAS security terminates in the mobility management entity (MME) and is performed in the NAS layer. RRC security terminates in the evolved node B (e-NB) and is performed in the Packet Data Convergence Protocol (PDCP). U-plane security consists of ciphering only (no integrity protection) and is also performed in the PDCP. In brief, the AKA procedures are completed in the NAS and NAS security keys are derived. The RRC/U-plane security parameters are derived in a cryptographically separate manner from the NAS keys. Knowledge of the RRC/U-plane keys does not allow an attacker to determine the NAS keys. The main rationale for this decision was that in LTE one might have e-NBs in vulnerable locations, such as in a home. RRC, and therefore security, is terminated in the e-NB, so this was considered to be a security risk. Hence two levels of security were adopted for the standard.

FIG. 2 is a block diagram of key hierarchy in LTE 200. As shown in FIG. 2, the USIM (in the wireless transmit/receive unit (WTRU)) and the Authentication Centre (AuC) 205 share a secret K 210. As part of a NAS Authentication and Key Agreement (AKA) signaling (similar to current UMTS AKA procedures) the USIM and the AuC/HSS derive a Ciphering Key (CK) 215 and an Integrity Key (IK) 220. The procedure for deriving the CK 215 and IK 220 are similar to that in UMTS where the AuC/HSS derives an Authentication Vector and sends a challenge to the WTRU in a NAS message which the WTRU responds to and the HSS/AuC verifies. Unlike UMTS however where the CK 215 and IK 220 are provided to the MAC/RLC layers to perform ciphering and/or integrity protection, in LTE the CK 215 and IK 220 are used to derive the remaining keys in the key hierarchy beginning with a master key—the so-called $K_{ASME}$ key 225. The remaining keys are derived from the $K_{ASME}$ key using different key derivation functions (KDF) and truncating.

$K_{eNB}$ 230 is a key derived by WTRU and MME from $K_{ASME}$ 225 or by WTRU and target eNB from KeNB* during eNB handover. The $K_{eNB}$ 230 is used for the derivation of keys for RRC traffic and the derivation of keys for UP traffic or to derive a transition key $K_{eNB}$* during an eNB handover.

$K_{NASint}$ 235 is a key that is used for the integrity protection of NAS signaling with a particular integrity algorithm. This key is derived by WTRU and MME 237 from $K_{ASME}$ 225, as well as an identifier for the integrity algorithm using a KDF.

$K_{NASenc}$ 240 is a key that is used for ciphering NAS signaling with a particular encryption algorithm. This key is derived by WTRU and MME 237 from $K_{ASME}$ 225, as well as an identifier for the encryption algorithm using a KDF.

$K_{UPenc}$ 245 is a key that is used for ciphering UP traffic with a particular encryption algorithm. This key is derived by WTRU and eNB 247 from $K_{eNB}$ 230, as well as an identifier for the encryption algorithm using a KDF.

$K_{RRCint}$ 250 is a key that is used for integrity protection of RRC traffic with a particular integrity algorithm. $K_{RRCint}$ 250 is derived by WTRU and eNB 247 from $K_{eNB}$ 230, as well as an identifier for the integrity algorithm using a KDF.

$K_{RRCenc}$ 255 is a key that is used for ciphering RRC signaling with a particular encryption algorithm. $K_{RRCenc}$ 255 is derived by WTRU and eNB 247 from $K_{eNB}$ 230 as well as an identifier for the encryption algorithm using a KDF.

The RRC and U-plane keys may be derived with the C-RNTI as an input.

In existing UTRAN security architecture, a check for correct ciphering and/or integrity protection is done in the RLC or MAC. The only security failure handling scenario currently in the NAS is if authentication fails. However with a separate ciphering and integrity protection procedure in the NAS, it would be desirable to define NAS procedures in response to scenarios in which a NAS message is received without being correctly ciphered and/or integrity protected.

The NAS relies on the AS, that is, the RLC or MAC, to verify that any Layer-3 (L3) messages received have the correct security credentials, that is, were ciphered and integrity protected properly. Since the new LTE architecture which has NAS layer security independent from AS security and the NAS verifies the security of L3 messages, this approach is inadequate because the checking of NAS security is done as part of procedures defined in NAS behavior. Thus it would be desirable for actions for the NAS to be defined in case of failure.

Since the NAS keys are independent of the RRC/U-plane keys (hereinafter, AS keys) it is possible to start/re-configure NAS ciphering independently of AS ciphering/integrity protection. It would be desirable to have new messages and procedures for this process. Also, key expiration may be linked to the NAS/RRC state of the WTRU. It would be desirable to have procedures for WTRU key handling.

The RRC typically receives the new CK and IK from the NAS and passes them to the MAC and RLC where ciphering/integrity protection is performed. However, in LTE, AS ciphering and integrity protection will be performed by the PDCP. Thus, it would be desirable to have new cross-layer procedures and primitives for proper security functioning.

SUMMARY

A method and apparatus are related to a wireless communication system that includes a wireless transmit receive unit (WTRU) configured to receive unciphered and ciphered messages. The unciphered messages may include identity requests, authentication requests, non-access stratum (NAS) security mode commands and tracking area update responses. The ciphered messages may come from the NAS and a Radio Resource Controller (RRC). The messages preferably are ciphered using security keys.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, enhanced Node-B (eNB), a site controller, an access point (AP), or any other type of interfacing device capable of operating in a wireless environment.

Security Failure Handling in the NAS

The procedures discussed below may be used if there are issues with security in some other layer, for example in the PDCP layer performing RRC ciphering/integrity protection. One procedure for handling security failure in the NAS is to provide a group of NAS messages that may be received by a WTRU without ciphering and/or integrity protection in the NAS being activated. Such a list only exists for UTRAN NAS messages, which are different from LTE NAS messages, and may be received without RLC/MAC ciphering being activated. The group of NAS messages that may be received by a WTRU without ciphering and/or integrity protection in the NAS being activated can include, but are not limited to:

Identity Request;
Authentication Request;
NAS Security Mode Command (this may only be received if at least integrity-protection in NAS is activated); and
Tracking Area Update Response.

In the MME the following messages may be received without ciphering and/or integrity protection:

Identity Response;
Authentication Response; and
Tracking Area Update Request.

In addition it may be mandated that while the above messages may be received without ciphering and/or integrity protection being activated, if ciphering and/or integrity protection has already been activated then these messages must be ciphered and/or integrity protected.

Some other NAS messages may only be sent if both NAS and RRC security has been activated. Some NAS messages may be sent if NAS security has been activated (independent of RRC security).

Figure 3:
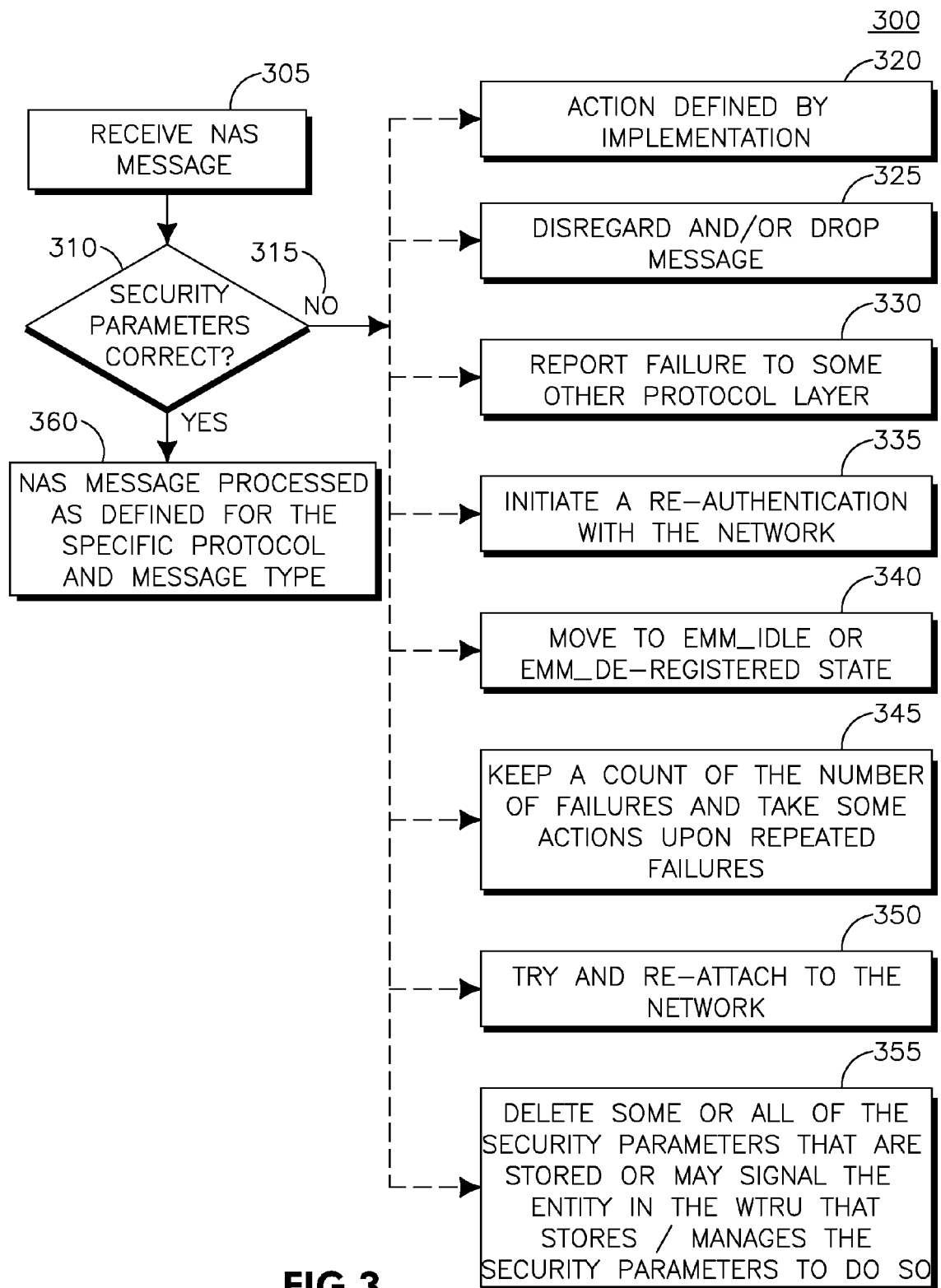
FIG. 3 is a block diagram of an embodiment where the agent may be the Mobility Management equivalent layer in LTE NAS or a new sub-layer for security or some other agent, and the security parameters defined for a given message are incorrect.

FIG. 3 is a block diagram 300 of an embodiment where the agent may be the Mobility Management equivalent layer in LTE NAS or a new sub-layer for security or some other agent. Once a NAS message is received 305 the agent responsible for checking the security status of the NAS message will check to see if the security parameters for the message are appropriate 310. If the security parameters defined for a given message are incorrect 315, that is, integrity checks fails or the message is not ciphered or if a message (depending on the protocol discriminator and message type fields in the header) should have been received ciphered and/or integrity protected but was not, the NAS layer, its sub-layer or the agent, may take any or all of the following actions in any sequence. The actions taken may depend on the type of message whose security parameters failed. The procedures defined below may also be used if there are issues with security in some other layer (e.g. RRC security fails):

The agent's actions may be defined by implementation 320;

The agent may disregard and/or drop the message 325;

The agent may report the failure to some other protocol layer (e.g. RRC), entity in the WTRU (e.g. USIM/UICC) network 330. If the agent checks the security and finds an error it may trigger, for example, a message to the network informing the network of the error. The report may include the reason for failure. If some other protocol layer/entity has been informed of such a failure their response may be similar to those described here;

The agent may initiate a re-authentication with the network 335;

The agent may move to Evolved Packet System (EPS) Mobility Management (EMM_Idle) modeor EMM_Deregistered state 340;

The agent may keep a count of the number of failures and take some actions upon repeated failures 345. These actions may be the same as those defined here;

The agent may try and re-attach to the network 350; or

The agent may delete some or all of the security parameters (keys/sequence numbers/key set identifiers) that are stored or may signal the entity in the WTRU, either directly or via an intermediary, that stores/manages the security parameters to do so 355.

If the security parameters are correct, the NAS message can be processed as defined for the specific protocol and message type 360. As an example this agent may be the Mobility Management equivalent layer in LTE NAS or a new sub-layer for security or some other agent.

Layer 3 Protocol Impacts

The existing L3 protocol header does not contain a sequence number. The header of a standard L3 message is composed of two octets. The header is structured in three main parts, the protocol discriminator (½ octet), a message type octet, and a half octet. The half octet is used in some cases as a Transaction Identifier, in some other cases as a sub-protocol discriminator, and called skip indicator otherwise. For example, if the Protocol Discriminator is set to GMM then it can be used as a skip indicator. If the protocol discriminator is set to SM then it may be used as a TI or as a sub-protocol discriminator. If its used as a skip indicator it means that for GMM messages the first 4 bits have no significance and are 'skipped'.

The protocol discriminator distinguishes between Mobility Management (MM) GPRS Mobility Management (GMM), Session Management (SM) messages and the like. While the message type indicates the kind of message, for example, Attach Request or PDP context activation, the transaction identifier allows the peer entities in the WTRU and in the network to distinguish up to 16 different bi-directional messages flows for a given protocol discriminator and a given Service Access Point (SAP). Such a message flow is called a transaction. An extension mechanism for a Transaction Identifier (TI) is also defined. This mechanism allows distinguishing up to 256 different bi-directional messages flows for a given protocol discriminator and a given SAP. For example when the WTRU attempts to obtain an IP address, there is an SM entity in the WTRU and in the network. If the WTRU then attempts to obtain another IP address, another pair of SM entities are created in the WTRU and in the network. The TI identifies which transaction, i.e. pair, a particular SM message is intended for.

Figure 4:
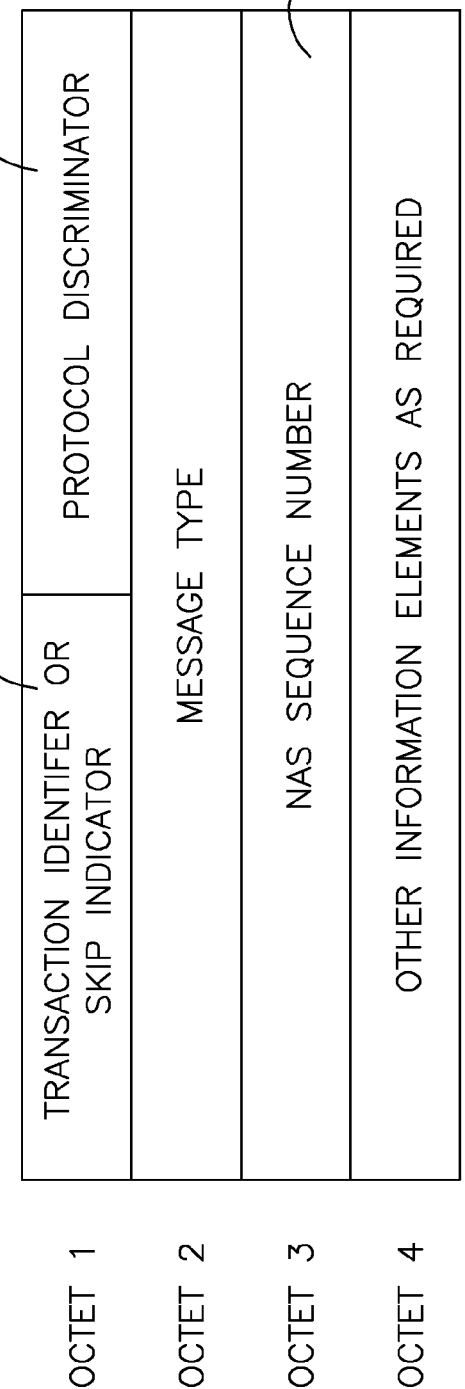
FIG. 4 is a block diagram of an improved layer 3 protocol header including a NAS sequence number.

FIG. 4 is a block diagram of an improved L3 protocol header 400 including an NAS sequence number 410. Like the existing L3 protocol header, the improved header is composed of two octets, and structured in three main parts. The three main parts are the protocol discriminator 420 (½ octet), a message type octet, and a half octet used in some cases as a Transaction Identifier 430, in some other cases as a sub-protocol discriminator, and called skip indicator otherwise. For example, if the Protocol Discriminator is set to GMM then it can be used as a skip indicator. If the protocol discriminator is set to SM then it may be used as a TI or as a sub-protocol discriminator. If its used as a skip indicator, it means that for GMM messages the first 4 bits have no significance and are 'skipped'. The improved header includes a sequence number for an NAS message 410, hereinafter referred to as an NAS SN. It may be included in the protocol header of a NAS message or as an Information Element (IE) in its content. The transaction identifier may also function as a sequence number. The NAS SN may have a pre-defined or negotiated incrementing period. As an example it could be on per NAS PDU (i.e. message) basis. The NAS layer may be able to perform duplicate detection based on the sequence number or using any other number which increments using the NAS SN, where the duplicate NAS PDUs received are discarded.

The NAS SN may be maintained per AS signaling radio bearer or per SAP, regardless of protocol discriminator or message type. It may also be maintained per TI.

A COUNT value may be used in the NAS layer. Increasing the COUNT value on a pre-defined/negotiated basis, for example, in every L3 message, can protect against replay or impersonation attacks. This is feasible with NAS level ciphering. A single COUNT value may be defined for all SAPs. A single COUNT-C may be defined for ciphering and a single COUNT-I for integrity protection, for all SAPs. A combination of COUNT-C and/or COUNT-I and/or single COUNT values may be defined for the SAPs. The COUNT may consist of two parameters; a NAS Sequence Number (SN) which increments on a pre-defined/negotiated regular basis, for example, per NAS Protocol Data Unit (PDU) or per NAS PDU on a given SAP, and a NAS Hyper-Frame Number (NAS HFN). The NAS HFN may be a counter that increments by one per x number of NAS SN increments. The COUNT parameter, in whole or parts, may be initialized based on a START value during initial-access/key-derivation/authentication/idle-to-active transition. The COUNT parameter may be used as input to the ciphering/de-ciphering integrity protection/integrity checking algorithms to ensure security.

The COUNT value may need to be setup before the activation of NAS security. The length of the count-C parameter could be 32 bits, or it could be reduced to a smaller value since a large SN might not be required for NAS messages. Also, the length of the SN field and the HFN field itself could be modified within the Count-C parameter to optimize it for NAS level procedures. Prior art ciphering engines may be used for NAS. An appropriate change should be made to the ciphering engine to accommodate a smaller value of count-C or change in value of the SN and HFN field.

Alternatively, the NAS COUNT value can be the NAS SN given that the NAS SN can be protected by the RRC encryption, so it is not open and therefore no hidden HFN is absolutely necessary. The NAS security may be activated not earlier than the RRC security and the NAS SN can be reset upon NAS security activation. In addition, duplicate detection in the NAS may be performed using the NAS COUNT value.

Additional parameters in place of length of the message or bearer ID which are inputs to the ciphering engine would need to be defined or additional procedures would need to be defined at NAS to extract these parameters when the NAS layer encrypts the message.

Alternatively on the WTRU side instead of having 2 separate ciphering engines for RRC and NAS, a single ciphering engine can be used which can work with both RRC and NAS parameters.

Further ciphering of messages at the NAS level can be optional and WTRU can indicate in its capability information whether it supports NAS level ciphering or not.

Key Handling in WTRU upon Transition from EMM Connected Mode to EMM Idle Mode

Typically, when a WTRU transitions from EMM_Connected mode to EMM_Idle mode the RRC connection is released. On active to idle transitions, an eNB typically does not store state information about the corresponding WTRU. The eNB typically deletes the current keys from its memory.

For this embodiment in particular, on active to idle transitions, the eNB can delete at least one of $K_{eNB}$, $K_{RRC\ enc}$ and $K_{RRC\ int}$ and $K_{UPenc}$. However, the MME may store $K_{ASME}$.

Figure 5:
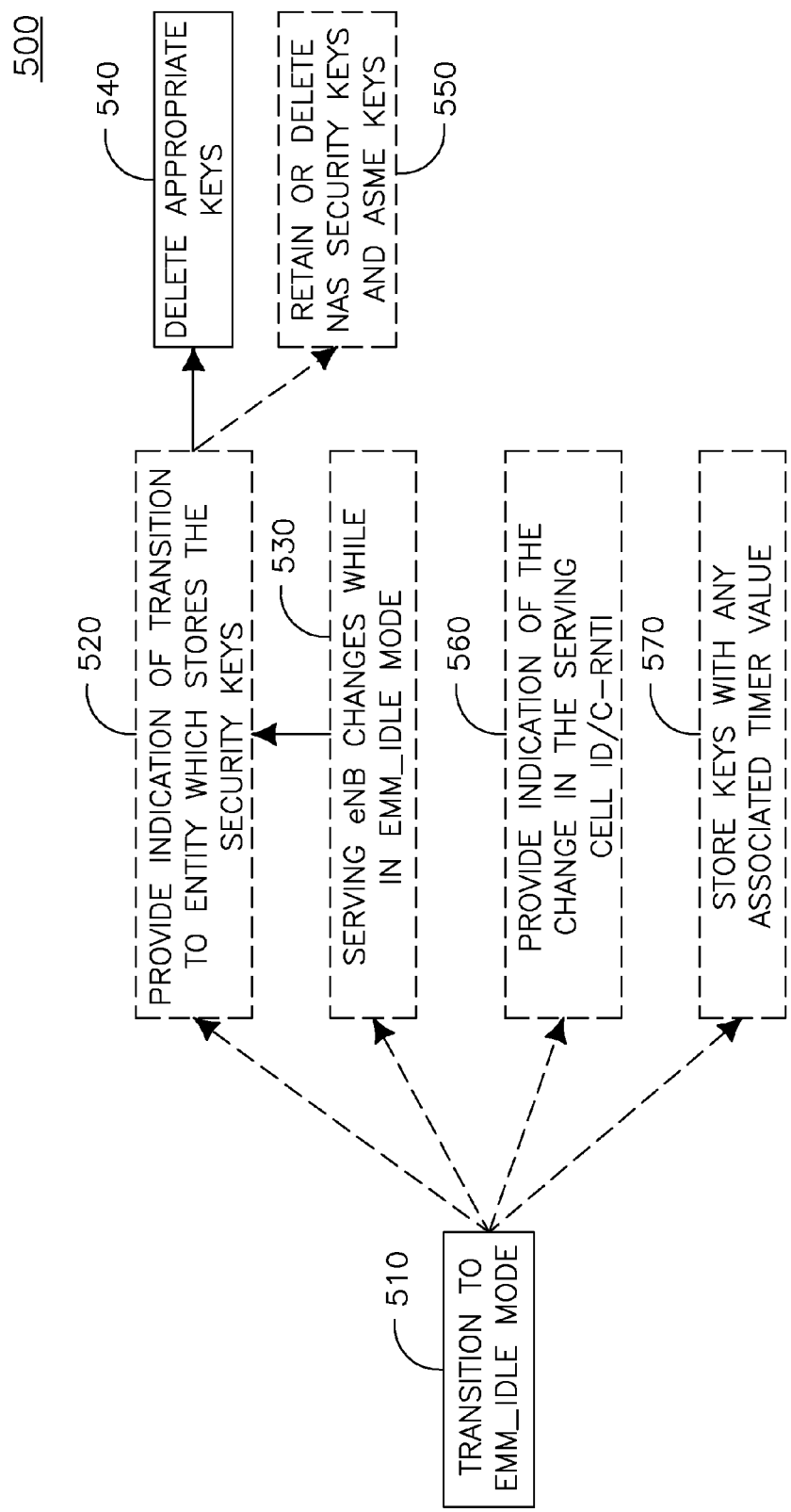
FIG. 5 is a block diagram illustrating key handling procedures in a WTRU upon transition from EMM_Connected mode to EMM_Idle mode.

FIG. 5 is a block diagram illustrating key handling procedures 500 in a WTRU upon transition from EMM_Connected mode to EMM_Idle mode. Thus far, WTRU procedures have not been defined in response to this transition. One possible procedure would be that upon transition to EMM_Idle mode 510, an indication of the transition could be provided by the WTRU to the entity which stores the security keys 520 in the WTRU, such as the UICC, USIM, or Mobile Equipment. Another possible procedure would be that an indication may be provided 520 by the WTRU to the storage entity when the serving e-NB changes while in EMM_Idle mode 530, such as during cell re-selection to different e-NB. The indication from the WTRU to the storage entity may include the identity of the e-NB so that new e-NB, RRC and U-plane keys may be derived. By way of example, the indications may be provided by the NAS and/or AS. For this purpose, predetermined primitives, including messages, IEs, interfaces and SAPs between protocol layers of the indicating the entity and/or between the indicating entity and the storage entity may be defined. It is understood that predetermined primitives includes both new and existing primitives which may be used. Upon receiving such a transition indication, the storage entity within the WTRU preferably will delete the appropriate keys 540, for example, at least one of $K_{eNB}$, $K_{RRCenc}$, $K_{RRC\ int}$ and $K_{UPenc}$. It may choose to retain or delete the NAS security keys and the ASME keys 550.

The storage entity may delete the $K_{RRC\ enc}$, the $K_{RRC\ int}$ and the $K_{UPenc}$ upon receiving an indication of Active to Idle transition and delete the $K_{eNB}$ when an indication of a change in the serving e-NB is received, such as during re-selection to a different e-NB. It may choose to retain or delete the NAS security keys and the ASME keys. Upon re-selection to a cell belonging to a different e-NB, determined by reading the e-NB identification on the broadcast channel, the WTRU may generate a new $K^*_{Enb}$ using the $K_{eNB}$ and a "next hop identifier".

The storage entity may not delete any keys upon transition from Active to Idle or upon transition to a new e-NB in Idle mode while it may delete keys upon transition from Idle to Active.

The storage entity may not delete any keys upon transition from Active to Idle or upon transition to a new e-NB in Idle mode. Instead, it may delete them when new keys are to be generated, for example, when an e-NB receives an RRC_Connection Request or a new C-RNTI is allocated.

A change in the serving cell ID/C-RNTI may be indicated 560 to the storage entity. This indication may be provided by the NAS and/or AS. Alternatively, the keys may be stored with an associated timer value 570. When a WTRU goes from Idle to Active or active to idle, the time may control how long a key may remain valid before it is eventually deleted.

Impacts to PDCP Layer due to Proposed Ciphering Architecture.

Typically, ciphering for RRC and U-plane traffic may be done in the PDCP layer. This imposes many architectural changes in the PDCP.

In this embodiment, the PDCP layer has the ability to receive the RRC security keys and U-Plane security keys from upper layers. Primitives may be defined as needed. Specifically the RRC or the NAS or the USIM may provide the PDCP with the required ciphering keys and the required START or COUNT or HFN or SN values. The PDCP layer may also have the ability to compute these values on its own based on the RRC header information.

Figure 1:
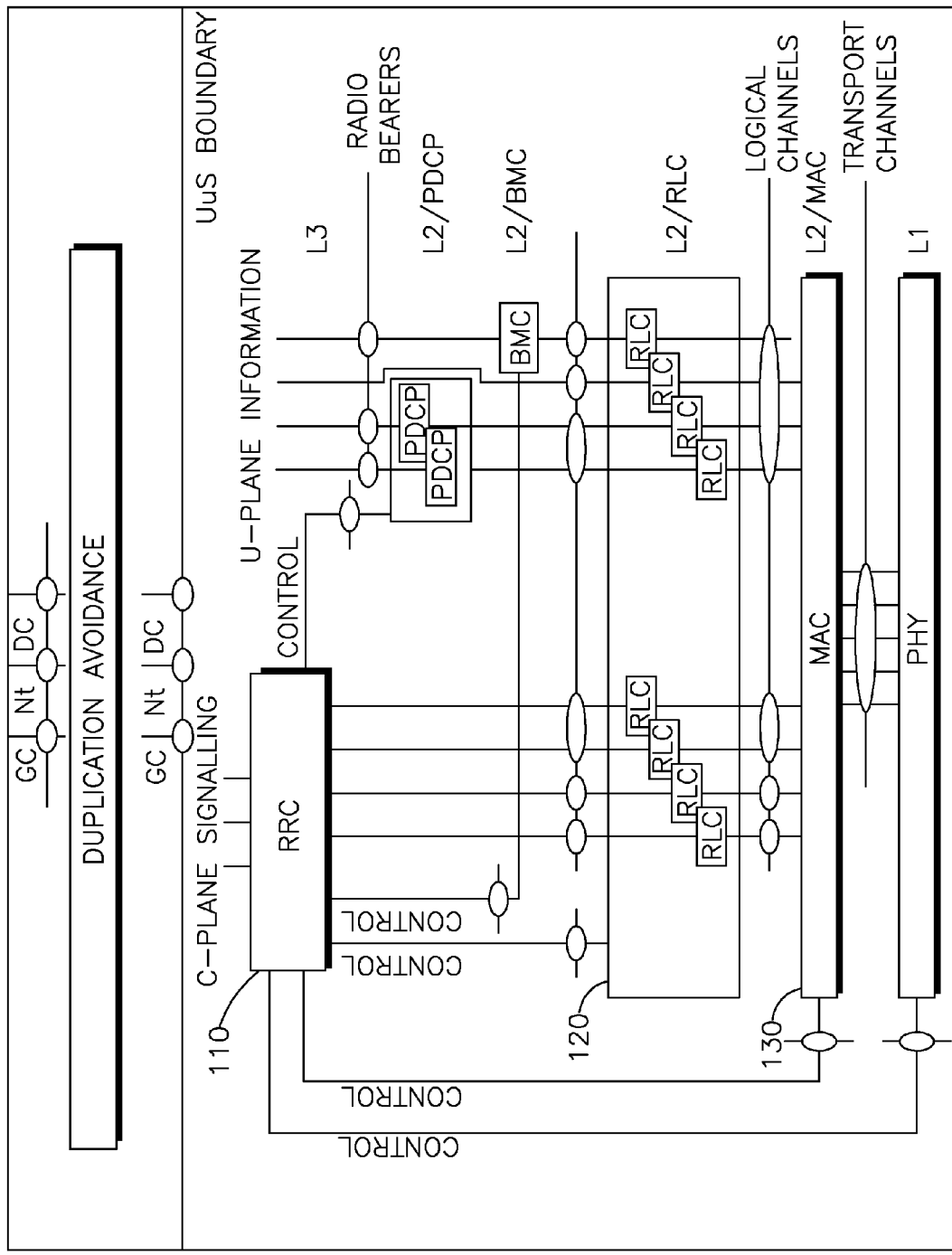
FIG. 1 is an access stratum protocol stack in accordance with the prior art.
Figure 2:
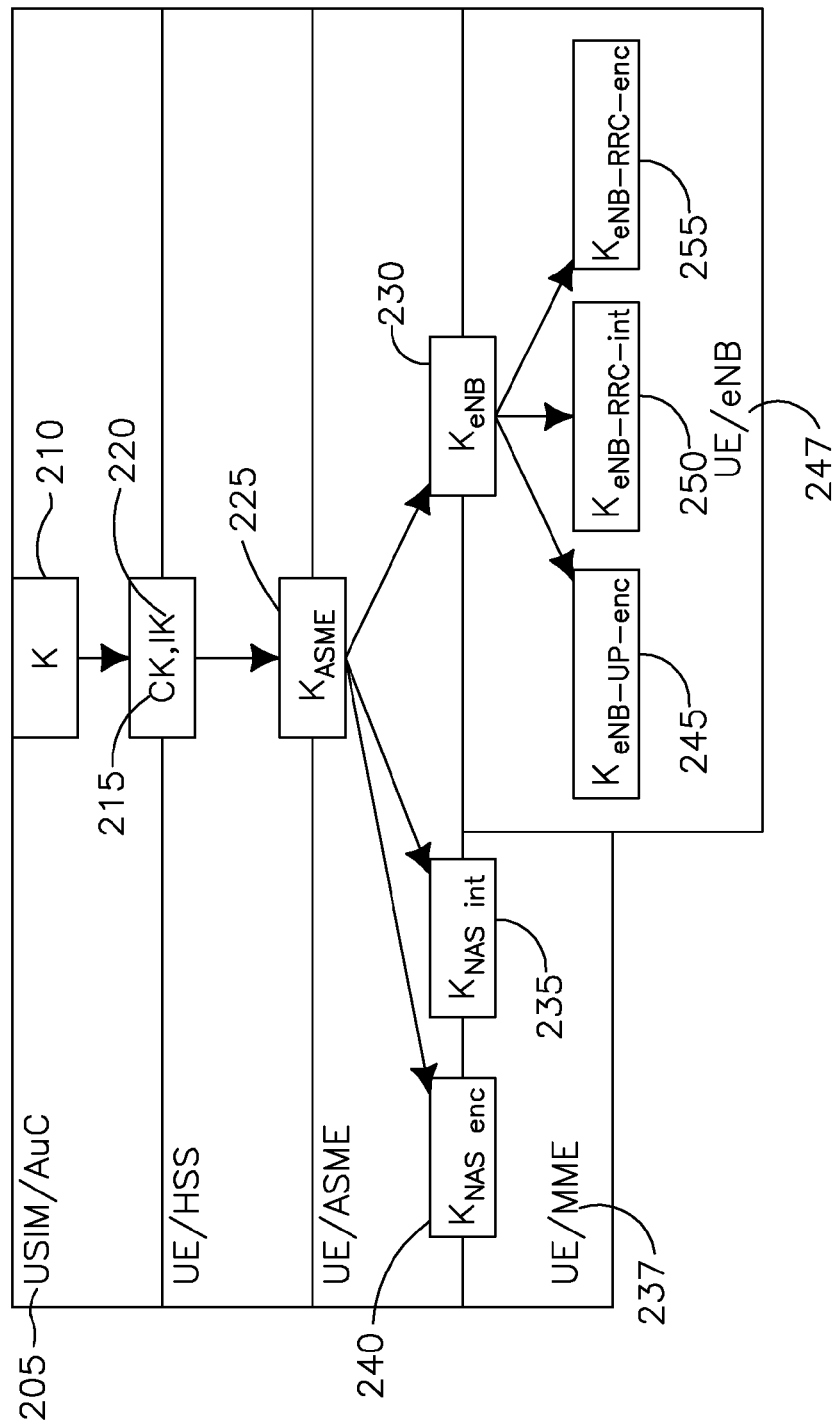
FIG. 2 is a block diagram of key hierarchy in LTE in accordance with the prior art.

Referring to FIG. 1, C-plane traffic does not pass through the PDCP. Since different radio bearers may be secured using different COUNT parameters, it is preferable that the PDCP layer be able to distinguish between different kinds of traffic. For this the incoming SDUs or the primitives carrying the SDUs may have explicit information regarding the destined radio bearers. The PDCP layer may determine that for itself and cipher/integrity-protect accordingly.

Figure 6:
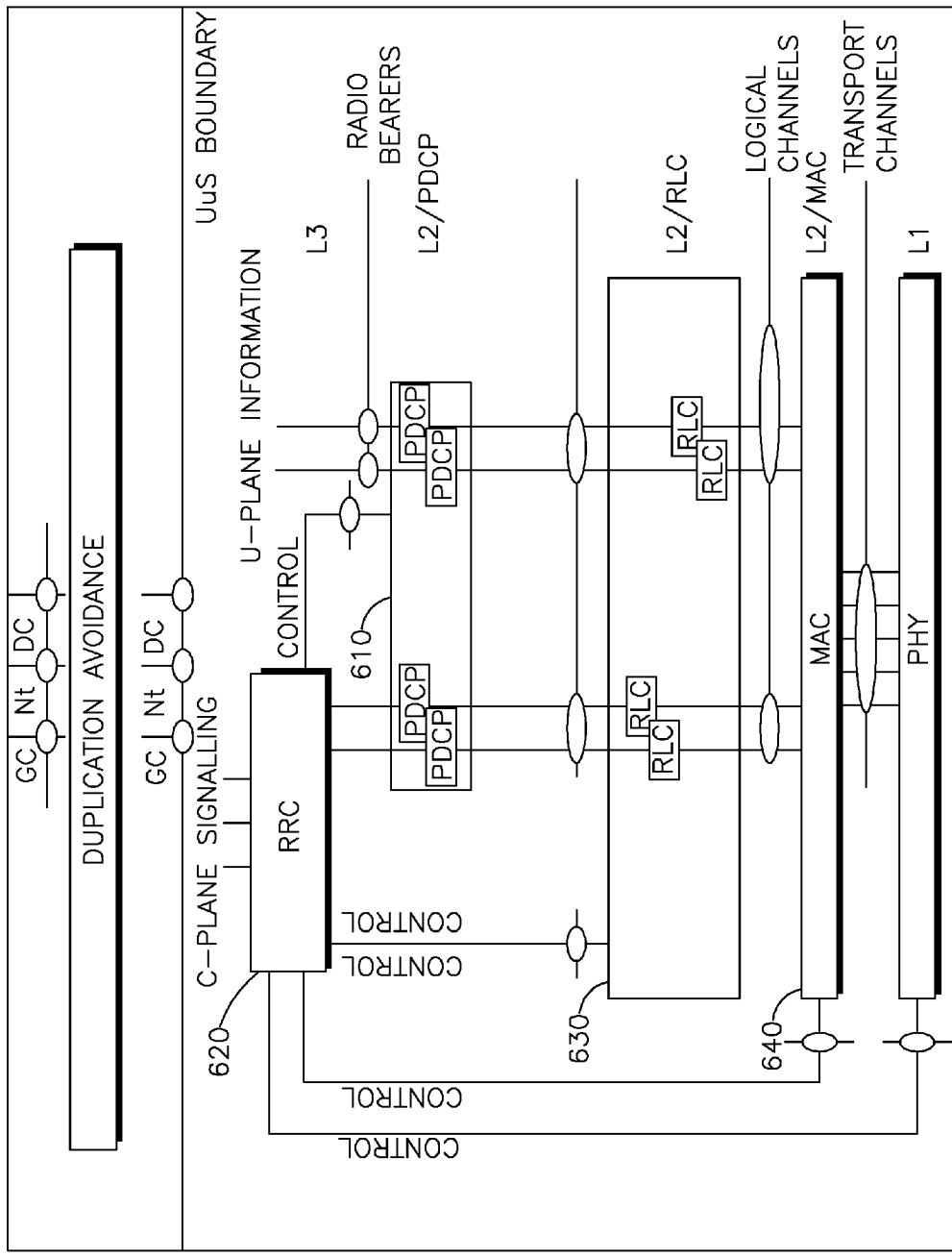
FIG. 6 is a block diagram of an access stratum protocol stack for LTE.

FIG. 6 is a block diagram of an access stratum protocol stack for LTE 600. Referring to FIG. 6, the C-plane traffic passes through the PDCP layer 610. The PDCP layer 610 checks the security of incoming PDCP PDUs. If the PDCP layer 610 sees that the security parameters of an incoming PDU (that is to be mapped either to a Data Radio Bearer or a Signaling Radio bearer) are incorrect (i.e. if for example the integrity check of the PDCP PDU fails) it may perform at least one of the following actions in any sequence. The actions taken may depend on the type of message whose security parameters failed. The procedures defined below may also be used if there are issues with security in some other layer, for example, if the NAS security fails:

the PDCP actions may be defined by implementation;
the PDCP may disregard and/or drop the message;
it may report the failure to some other protocol layer, such as the RRC entity in the WTRU; another protocol layer may be informed of such a failure;
it may keep a count of the number of failures and take some actions upon repeated failures (e.g. X number of failures in Y messages or units of time) such as the ones defined here or some other actions;
it may delete some or all of the security parameters, such as keys and sequence numbers, that are stored or may signal the entity in the WTRU, directly or indirectly, that stores or manages the security parameters to do so; and
a failure report to other protocol layers may include the reason for the failure.

The PDCP HFN may be used to constitute a COUNT value. This COUNT value can be used in the ciphering and/or integrity protection algorithms of the PDCP 510 and may be initialized by a START value. There may be multiple COUNT values for each radio bearer that the PDCP may protect. The RRC 620 and PDCP layers 610 may be able to exchange information related to the COUNT value or its constituents.

The PDCP layer 610 may check for the integrity protection of a message. This is in line with the assumption that integrity-protection is in the PDCP 610. However, currently the Message Authentication Code (MAC) word appended to a message in order to verify its integrity, is computed in the RRC 620 appended to the RRC message and passed down to the RLC 630/Medium Access Control (MAC) 640. The entire message, including the MAC word, is ciphered. Also, the PDCP layer 610 may not be able to determine whether a RRC message needs protection.

On the transmit side, the RRC layer 620 may indicate to the PDCP layer 610 whether a given RRC message requires or does not require integrity protection and/or ciphering. The PDCP layer 610 may use this indication to determine whether or not to perform ciphering and/or integrity protection on the RRC messages to be sent as PDCP PDUs.

This indication may be an explicit indication provided by the RRC to the PDCP layer in every RRC message sent by the RRC to the PDCP using new bits. Alternatively or in addition, the indication may be implicit, for example, ciphering and/or integrity protection in the PDCP will always be on unless indicated or will always be off unless indicated otherwise by the RRC. As an example, a 2-bit indicator could be used by the RRC layer 620 to indicate any combination of ciphering and integrity protection being active. Such an indication may be sent with each RRC message passed to the PDCP or may apply to all RRC messages and is preferable as some RRC messages may not be ciphered and/or integrity protected.

Alternatively, or in addition, the RRC layer 620 may indicate to the PDCP layer 610 that all RRC messages beginning with a given RRC message will be integrity protected.

Alternatively, or in addition, the RRC layer 620 may indicate to the PDCP layer 610 that all RRC messages beginning with a given RRC message will be ciphered.

Alternatively, or in addition, the RRC layer 620 may indicate to the PDCP layer 610 that all RRC messages beginning with a given RRC message will be ciphered and integrity protected.

Alternatively, or in addition, the RRC layer 620 may provide a list of generic RRC messages to the PDCP layer 610 and their associated security parameters. The list may include messages that may be received without ciphering and/or integrity protection, such as, for example, a RRC Connection Re-establishment. The list may include messages that may be received with ciphering and/or integrity protection.

Alternatively, or in addition, a ciphering and/or integrity checking flag may be defined, optionally by the RRC layer 620, which, if set, the PDCP layer 610 will cipher and/or integrity check all RRC messages. The PDCP layer 610 will thus check this flag before ciphering and integrity checking. There may be separate flags set for ciphering and integrity protection.

For all the different indication mechanisms above the indication may be provided on a per Signaling Radio Bearer (SRB) basis i.e. the RRC layer 620 may indicate to the PDCP layer 610 that the indication for ciphering and/or integrity protection applies to RRC messages mapped by the PDCP layer 610 to a specific SRB.

For a message to be transmitted, the PDCP layer 610 may first integrity protect and then cipher or it may first cipher and then integrity protect. Prior to either operation it may pad the message so as to achieve optimal length for ciphering and/or integrity protection. Prior to the security operation the PDCP layer 610 may assign a SN. The SN may be a PDCP SN or may reuse a RRC SN or may use another sequence number, such as, for example, a common sequence number. Prior to the security operation, the PDCP layer 610 may perform header compression for U-plane traffic.

The MAC word for integrity protection may be computed over the plain text data, the ciphered data and/or all or part of the PDCP header.

Ciphering may be performed over the entire message, including a MAC word, and/or the plain text message and/or their parts.

Ciphering may also be performed over all or part of the PDCP header, for example, excluding the SN.

An indication of whether the payload has been ciphered and/or integrity protected can be included. For example, the PDCP layer 610 on the transmit side may include an IE indicating the presence of integrity check information and/or ciphering being activated. This indication may be ciphered. This indication may indicate the position of the MAC-word within the message for the PDCP layer to check. The PDCP layer 610 on the receive side may use this indication to decide whether to de-cipher and/or integrity check.

The PDCP layer 610 and protocol may include a MAC word for integrity checking in a pre-defined position within the PDCP header/message for the receiver. Alternatively, a MAC word position may be indicated to the receive PDCP layer 610. Such an indication may be, as an example, an offset field in the header.

Depending on the order of the security operation on the transmit side, the receiving PDCP will either decipher an incoming message first and then check its integrity or first check the integrity and then decipher the message. The security operations in the receiving unit preferably is in the reverse order to that of the transmit unit. The position of the MAC-word within the PDCP header/message may be assisted by an indication field.

The PDCP layer 610 may decide if ciphering and/or integrity protection is not satisfactory for a particular message. This means that the PDCP will determine whether or not the message has been ciphered and/or integrity protected correctly.

The PDCP layer 610 may indicate to the RRC layer the security status of the message it is passing to the RRC layer 620, for example, if the message is received with ciphering and/or integrity protection. Or as another example if the integrity protection check was successful or not. The indication may be implicit, that is, only provided when there is an error, for example, if the integrity protection check fails. The RRC layer 620 may then decide if the protection for a particular message is acceptable. The RRC behavior when notified of an error may be as defined for the PDCP in paragraph [0066]. Alternatively, or in addition, the RRC layer may notify the network of the failure of the integrity check by adding an Information Element (to the RRC message it sends to the network) which informs the network of the failure.

In case of error, the PDCP layer 610 may take steps described in the failure handling scenarios set forth above. If the RRC message is ASN.1 encoded and the MAC word is included in the RRC layer 620, the PDCP layer 610 may look into the RRC layer and check the MAC word. It may do so if the flag indicating integrity protection is set.

Cross-Layer Security Procedures

The RRC/PDCP layer may receive the e-NB/RRC/U-plane keys from the NAS layer or from the USIM. Alternatively, the RRC/PDCP may generate its own keys. As an example the RRC layer may generate e-NB/RRC/U-plane keys using parameters received from the network in RRC signaling and the $K_{ASME}$ received from the NAS and other parameters received from other protocol layers (e.g. the physical cell identity of the cell on which the WTRU is currently camped on or accessing may be obtained from the physical layer). These security keys may be passed between the NAS and the RRC/PDCP or between the RRC and the PDCP using predetermined primitives, including new or existing primitives, over new or existing SAPs. Each layer may have the ability to indicate an error, that is, a security failure, to the upper/lower layers.

Figure 7:
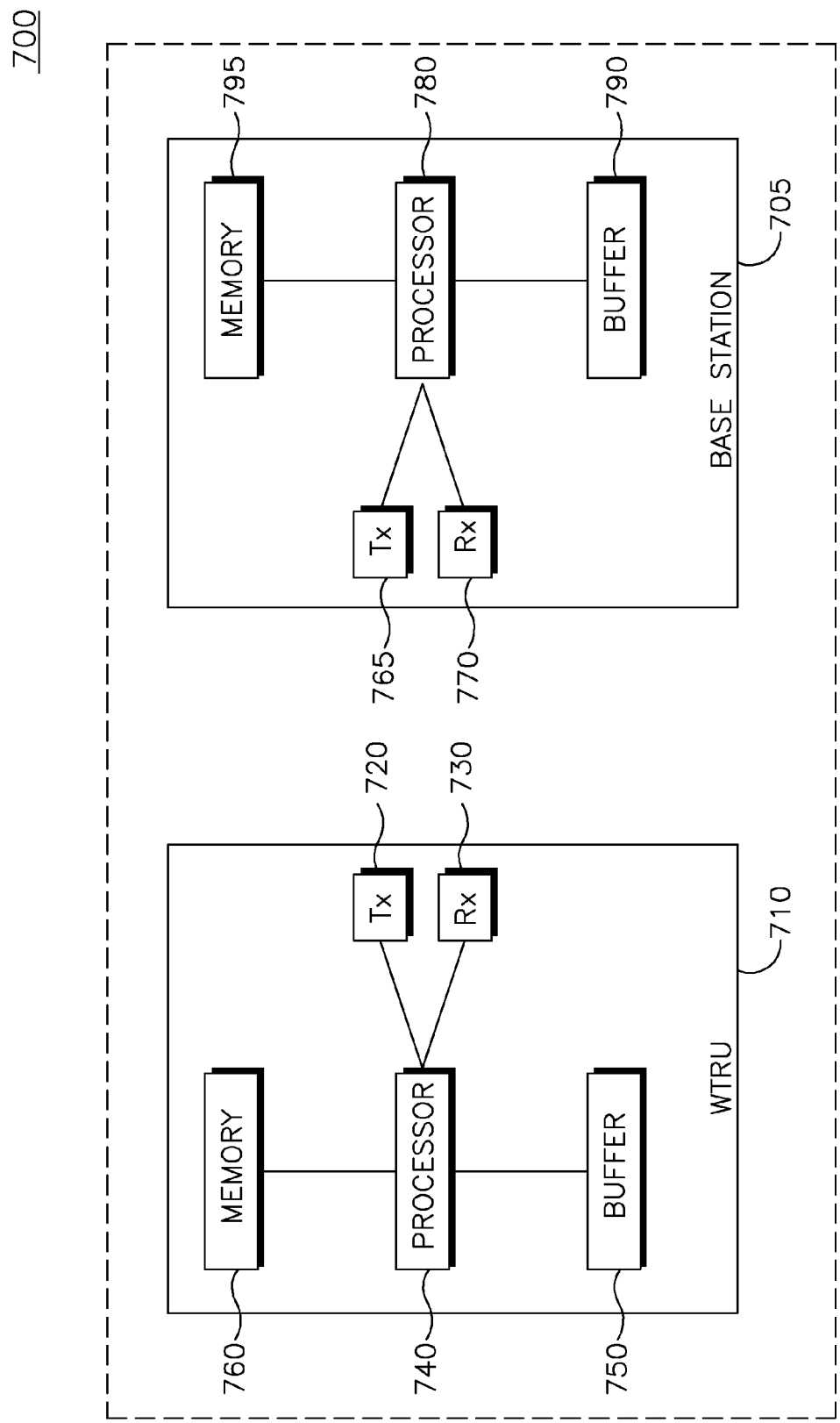
FIG. 7 is a block diagram of a wireless communication system configured for ciphered and unciphered messaging in LTE.

FIG. 7 is a block diagram of a wireless communication system 700 configured for ciphered and unciphered messaging in LTE. The system includes a base station 705 and a wireless transmit receive unit (WTRU) 710. The base station 705 and the WTRU 710 communicate via a wireless communications link.

As shown in FIG. 7, the WTRU 710 includes a transmitter 720, a receiver 730, and a processor 740. The processor 740 is attached to a buffer 750 and a memory 760. The processor 740 is configured to process NAS messages containing security parameters using at least one technique described above.

Also shown in FIG. 7 is the base station 705 which includes a transmitter 765, a receiver 770, and a processor 780. The processor 780 is attached to a buffer 790 and a memory 795. The processor 780 is configured to process NAS messages containing security parameters using at least one technique described above.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) configured to implement security in Long Term Evolution (LTE) wireless communications, the WTRU comprising:
   a receiver configured to receive a non-access stratum (NAS) message that includes a NAS sequence number (NAS SN); and
   a processor configured to:
      perform an integrity check on the NAS message by using a count value as an input to an integrity algorithm, wherein the count value comprises the NAS SN and a NAS counter that increments based on the value of the NAS SN;
      handle the received NAS message based on the integrity check, wherein when the received NAS message fails the integrity check, the NAS message is discarded, and when the received NAS message passes the integrity check, the NAS message is processed.

2. The WTRU of claim 1, wherein the processor comprises: a ciphering radio resource controller (RRC) engine; and a ciphering NAS engine.

3. The WTRU of claim 1, wherein the processor comprises: a ciphering engine configured to operate with both RRC and NAS parameters.

4. The WTRU of claim 1, wherein the security procedure includes at least one of the following: reporting a failure to another protocol layer, initiating a re-authentication, moving to Evolved Packet System (EPS) Mobility Management (EMM_Idle) mode, moving to EMM_Deregistered state, maintaining count of number of failures, proceeding to re-attach to a network, or deleting the security parameters.

5. A method for implementing security in a wireless device, the method comprising:
   receiving a non-access stratum (NAS) message that includes a NAS sequence number (NAS SN);
   performing an integrity check on the NAS message by using a count value as an input to an integrity algorithm, wherein the count value comprises the NAS SN and a NAS counter that increments based on the value of the NAS SN;
   handling the received NAS message based on the integrity check, wherein when the received NAS message fails the integrity check, the NAS message is discarded, and when the received NAS message passes the integrity check, the NAS message is processed.

6. The method of claim 5, wherein the security procedure includes at least one of the following: reporting a failure to another protocol layer, initiating a re-authentication, moving to Evolved Packet System (EPS) Mobility Management (EMM_Idle) mode, moving to EMM_Deregistered state, maintaining count of number of failures, proceeding to re-attach to a network, or deleting the security parameters.

7. The method of claim 1, further comprising: performing duplicate detection based on the NAS sequence number.

8. The method of claim 7, wherein the NAS sequence number functions as a transaction identifier.

9. The method of claim 7, wherein the NAS sequence number contains a pre-defined incrementing period.

10. The method of claim 7, wherein the NAS sequence number contains a negotiated incrementing period.

11. The method of claim 5, wherein the NAS message is correlated with count value.

12. The method of claim 5, wherein the count value is for ciphering (COUNT-C).

13. The method of claim 5, wherein the count value is for integrity protection (COUNT-I).

14. The method of claim 5, wherein the count value is a combination of a COUNT-C and a COUNT-I.

15. The method of claim 5, wherein the count value is used as an input to a ciphering integrity protection algorithm.

16. The method of claim 5, wherein the count value is used as an input to a de-ciphering integrity protection algorithm.

17. The method of claim 5, wherein the count value is configured before NAS security activation.

18. The method of claim 5, wherein the count value is 32 bits or less.

19. The method of claim 5, wherein the NAS SN and the NAS counter are configurable.

20. The method of claim 5, wherein duplicate detection is performed using the count value.

21. The method of claim 5, wherein the NAS message indicates wireless transmit/receive unit (WTRU) capability information.

22. The method of claim 21, wherein the WTRU capability information indicates support for NAS level ciphering.

* * * * *